US012088040B2

(12) United States Patent
Shih

(10) Patent No.: US 12,088,040 B2
(45) Date of Patent: Sep. 10, 2024

(54) QUICK-RELEASE COMBINATION STRUCTURE

(71) Applicants: Inventec (Pudong) Technology Corporation, Shanghai (CN); INVENTEC CORPORATION, Taipei (TW)

(72) Inventor: Ming Hung Shih, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 345 days.

(21) Appl. No.: 17/805,465

(22) Filed: Jun. 5, 2022

(65) Prior Publication Data

US 2023/0291141 A1 Sep. 14, 2023

(30) Foreign Application Priority Data

Mar. 8, 2022 (CN) ......................... 202210220685.5

(51) Int. Cl.
*H01R 13/52* (2006.01)
*H01R 13/447* (2006.01)

(52) U.S. Cl.
CPC ....... *H01R 13/5213* (2013.01); *H01R 13/447* (2013.01); *H01R 2201/26* (2013.01)

(58) Field of Classification Search
CPC .... H01R 13/5213; H01R 13/52; H01R 13/44; H01R 13/443; H01R 13/447; H01R 2201/26
USPC .................................................. 439/135–136
See application file for complete search history.

(56) References Cited

U.S. PATENT DOCUMENTS 8,414,314 B1 * 4/2013 Mosholder ............. H01R 13/44
439/133
2013/0321998 A1 * 12/2013 Han ..................... H01R 13/443
361/679.02
2023/0291141 A1 * 9/2023 Shih ................... H01R 13/5213

FOREIGN PATENT DOCUMENTS

TW M584566 U 10/2019

* cited by examiner

*Primary Examiner* — Khiem M Nguyen
(74) *Attorney, Agent, or Firm* — CKC & Partners Co., LLC

(57) ABSTRACT

A quick-release combination structure includes a panel and a water-proof cover. The panel includes a groove and a sliding channel. The groove is recessed from a surface of the panel. The sliding channel is connected to the groove and runs through the panel. The water-proof cover includes a cover body and a guiding plate. The cover body is configured to be at least partially accommodated in the groove and cover the sliding channel. The guiding plate is connected to the cover body and slidably inserted in the sliding channel. A thickness of the guiding plate is smaller than a distance of an inner wall of the sliding channel in a thickness direction of the guiding plate, thereby allowing two ends of the guiding plate to seesaw in the thickness direction relative to the panel.

19 Claims, 8 Drawing Sheets

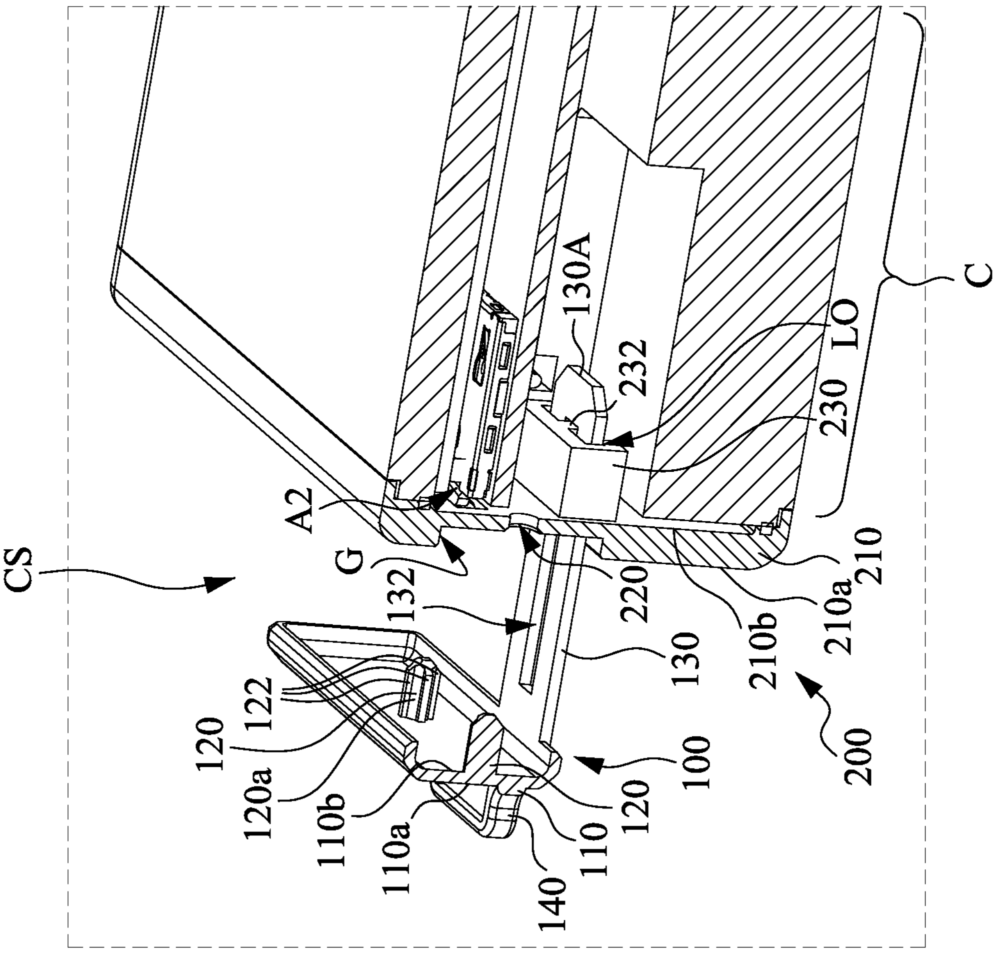
Fig. 5
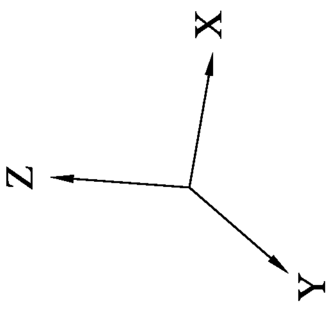

QUICK-RELEASE COMBINATION STRUCTURE

CROSS-REFERENCE TO RELATED APPLICATION

This application claims priority to China Application Serial Number 202210220685.5, filed Mar. 8, 2022, which is herein incorporated by reference in its entirety.

BACKGROUND

Field of Invention

The present disclosure relates to a quick-release combination structure.

Description of Related Art

Generally, a car USB hub (USB hub) includes several slots. For example, a car's USB port may include two USB Type C slots and an SD card slot for use by passengers in the car. In this way, passengers in the car can use the car's USB port to charge their mobile phones. The car's USB port is usually located in the center console of the car. The center console of the car is located in the area below the screen or in the center armrest area between the passenger seats in the car.

However, in the vicinity of the USB ports, the electronic components in the central console may be damaged due to accidental splashing of water or beverages by passengers in the vehicle onto the USB ports. Direct use of off-the-shelf dust-proof or drip-proof I/O protective covers (for example, I/O water-proof covers) cannot be applied to the center console of a car of a specific size, and its operating form cannot meet the requirements.

Therefore, how to propose a quick-release combination structure to meet the requirements of anti-splashing to protect the electronic components in a central control device and achieve the effect of making the water-proof cover easy to disassemble and assemble is one of the problems that the industry urgently wants to invest in research and development resources to solve.

SUMMARY

In view of this, one purpose of present disclosure is to provide a quick-release combination structure that can solve the aforementioned problems.

In order to achieve the above objective, according to one embodiment of the present disclosure, a quick-release combination structure includes a panel and a water-proof cover. The panel includes a groove and a sliding channel. The groove is recessed from a surface of the panel. The sliding channel is connected to the groove and runs through the panel. The water-proof cover includes a cover body and a guiding plate. The cover body is configured to be at least partially accommodated in the groove and cover the sliding channel. The guiding plate is connected to the cover body and slidably inserted in the sliding channel. A thickness of the guiding plate is smaller than a distance of an inner wall of the sliding channel in a thickness direction of the guiding plate, thereby allowing two ends of the guiding plate to seesaw in the thickness direction relative to the panel.

In one or more embodiments of the present disclosure, the sliding channel includes a guiding block disposed on an inner wall of the sliding channel, the guiding plate includes a guiding groove, and the guiding block is configured to be slidably engaged with the guiding groove.

In one or more embodiments of the present disclosure, the guiding block includes an inclined surface facing the cover body.

In one or more embodiments of the present disclosure, the guiding plate includes an end portion, and the end portion encloses an end of the guiding groove away from the cover body.

In one or more embodiments of the present disclosure, the sliding channel includes a lower opening disposed relative to the guiding block.

In one or more embodiments of the present disclosure, the guiding plate is connected to an edge of the cover body.

In one or more embodiments of the present disclosure, the water-proof cover further includes a positioning column disposed on a surface of the cover body, the panel has a positioning hole, and the positioning column is configured to be combined with the positioning hole.

In one or more embodiments of the present disclosure, the positioning column includes an extending portion, and the extending portion protrudes outward from a surface of the positioning column and is connected to the surface of the cover body.

In one or more embodiments of the present disclosure, the extending portion and the positioning column extend in a direction.

In one or more embodiments of the present disclosure, the water-proof cover further includes a handle disposed on a side of the cover body away from the panel.

In order to achieve the above objective, according to one embodiment of the present disclosure, a quick-release combination structure includes a panel and a water-proof cover. The panel includes a sliding channel. The sliding channel includes a guiding block disposed on an inner wall of the sliding channel. The water-proof cover includes a cover body and a guiding plate. The cover body is configured to cover the sliding channel. The guiding plate is connected to the cover body and slidably inserted in the sliding channel. The guiding plate includes a guiding groove, and the guiding block is configured to be slidably engaged with the guiding groove. A thickness of the guiding plate is smaller than a distance of an inner wall of the sliding channel in a thickness direction of the guiding plate, thereby allowing two ends of the guiding plate to seesaw in the thickness direction relative to the panel.

In one or more embodiments of the present disclosure, the guiding block includes an inclined surface facing the cover body.

In one or more embodiments of the present disclosure, the guiding plate includes an end portion, and the end portion encloses an end of the guiding groove away from the cover body.

In one or more embodiments of the present disclosure, the sliding channel includes a lower opening disposed relative to the guiding block.

In one or more embodiments of the present disclosure, the guiding plate is connected to an edge of the cover body.

In one or more embodiments of the present disclosure, the water-proof cover further includes a positioning column disposed on a surface of the cover body, the panel has a positioning hole, and the positioning column is configured to be combined with the positioning hole.

In one or more embodiments of the present disclosure, the positioning column includes an extending portion, and the extending portion protrudes outward from a surface of the positioning column and is connected to the surface of the cover body.

In one or more embodiments of the present disclosure, the extending portion and the positioning column extend in a direction.

In one or more embodiments of the present disclosure, the water-proof cover further includes a handle disposed on a side of the cover body away from the panel.

In summary, in the quick-release combination structure of the present disclosure, since the sliding channel includes the guiding block and is disposed on the inner wall of the sliding channel and the guiding plate includes the guiding groove, so that the guiding block and the guiding groove are slidably engaged, thereby the water-proof cover combined with the panel. In the quick-release combination structure of the present disclosure, since the water-proof cover includes positioning columns disposed on the surface of the cover body, and the panel includes positioning holes, the positioning columns and the positioning holes can be combined and tightly fitted with each other, which not only makes it difficult for the cover body to separate and loose from the panel, but can effectively prevent the electronic components in the central control device from being damaged due to the spilling and splashing of liquid from the outside. In the quick release combination structure of the present disclosure, since the guiding plate includes the end portion and the guiding block includes a stop surface, so that the end portion can be stopped by the stop surface of the guiding block, thereby preventing the user from pulling the water-proof cover separating from the panel when the user pulls the waterproof cover away from the panel. In the quick-release combination structure of the present disclosure, since the guiding plate includes the end, the guiding block has the inclined surface, and the sliding channel includes the lower opening, the user can easily install the water-proof cover on the panel. With the quick-release combination structure of the present disclosure, the user can quickly install the water-proof cover on the panel, and effectively protect the electronic components in the central control device from being damaged.

The aforementioned description is only used to explain the problem to be solved by the present disclosure, the technical means to solve the problem, and the effects produced, etc. The specific details of the present disclosure will be well discussed in the following embodiments and related drawings.

BRIEF DESCRIPTION OF THE DRAWINGS

In order to make the above and other objectives, features, advantages and examples of the present disclosure more obvious, the description of the accompanying drawings is as follows:

FIG. 5 shows a three-dimensional cross-sectional view of a quick-release combination structure according to an embodiment of the present disclosure;

DETAILED DESCRIPTION

Figure 1:
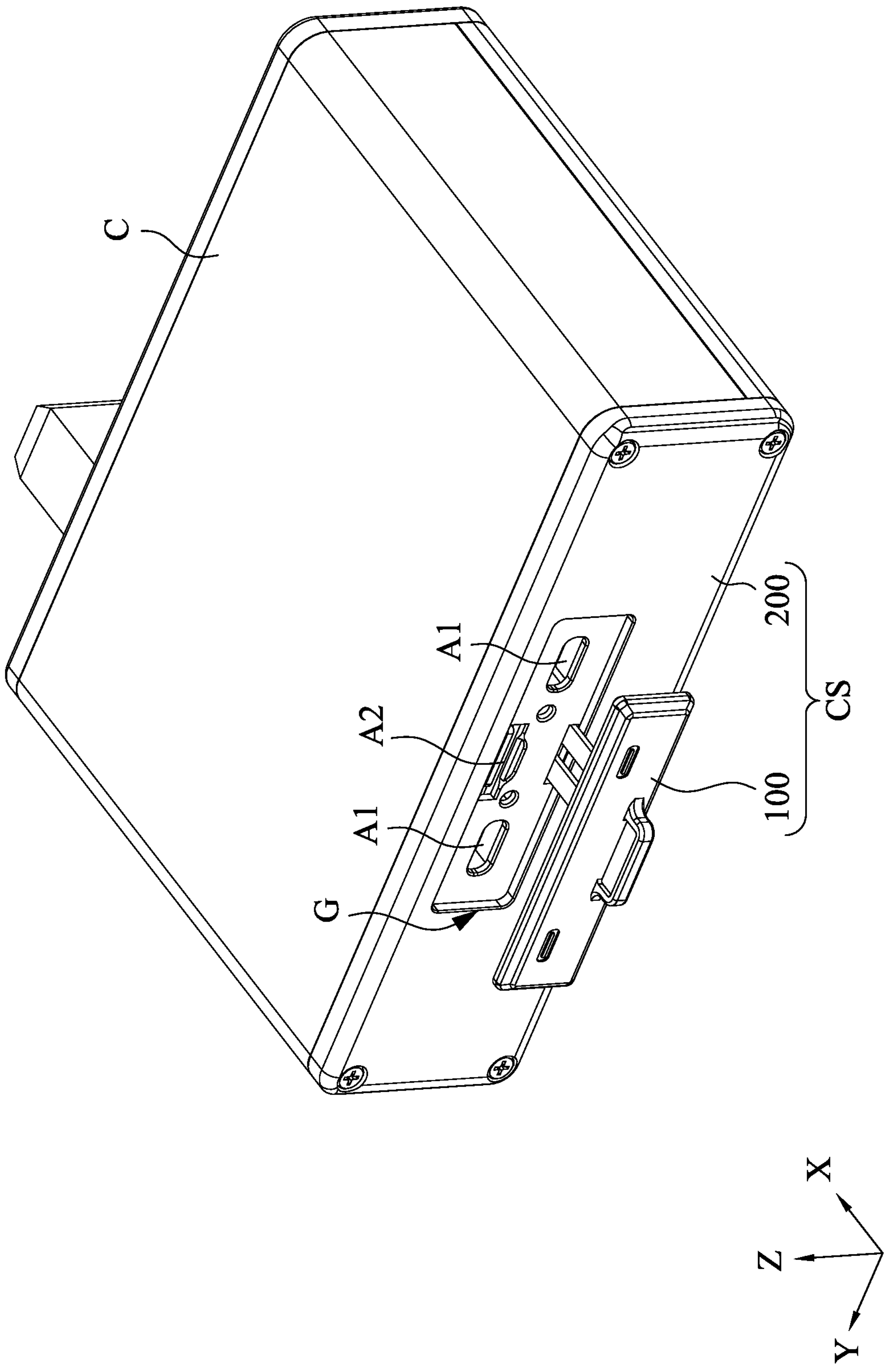
FIG. 1 shows a schematic view of a quick-release combination structure and a central control element according to an embodiment of the present disclosure.

Hereinafter, a plurality of embodiments of the present disclosure will be disclosed in diagrams. For clarity of discussion, many details in practice will be described in the following description. However, it should be understood that these details in practice should not limit present disclosure. In other words, in some embodiments of present disclosure, these details in practice are unnecessary. In addition, for simplicity of the drawings, some conventionally used structures and elements will be shown in a simple schematic manner in the drawings. The same reference numbers are used in the drawings and the description to refer to the same or like parts.

Hereinafter, the structure and function of each component included in a quick-release combination structure of this embodiment and the connection relationship between the components will be described in detail.

Reference is made to FIG. 1. FIG. 1 is a schematic view of a quick-release combination structure CS and a central control device C according to an embodiment of the present disclosure. In this embodiment, the quick-release combination structure CS is located on one side of the central control device C. As shown in FIG. 1, the quick-release combination structure CS includes a water-proof cover 100 and a panel 200. The panel 200 has a groove G, a first opening A1, and a second opening A2. The water-proof cover 100 is configured to be combined with the panel 200 to cover the first opening A1 and the second opening A2. The water-proof cover 100 may be made of a soft and elastic plastic material, such as TPU (Thermoplastic Urethane).

In some embodiments, the central control device C may be, for example, an in-vehicle center console, but the present disclosure does not intend to limit the type of the central control device C.

In some embodiments, the first opening A1 is configured to communicate with, for example, a USB Type-C port located in the central control device C. Therefore, the first opening A1 is configured for a user to insert, for example, a wire including a USB Type-C connector. In this case, the shape of the first opening A1 matches that of the USB Type-C connector and the USB Type-C port. This is merely an example for simple description, and the present disclosure does not intend to limit the shape of the first opening A1.

In some embodiments, the second opening A2 is configured to communicate with, for example, a memory card port (for example, an SD card (Secure Digital Memory Card) port) located in the central control device C. Therefore, the second opening A2 is configured for the user to insert, for example, an SD card. In this case, the shape of the second opening A2 matches that of the SD card and the SD card port. This is merely an example for simple description, and the present disclosure does not intend to limit the shape of the second opening A2.

Figure 2:
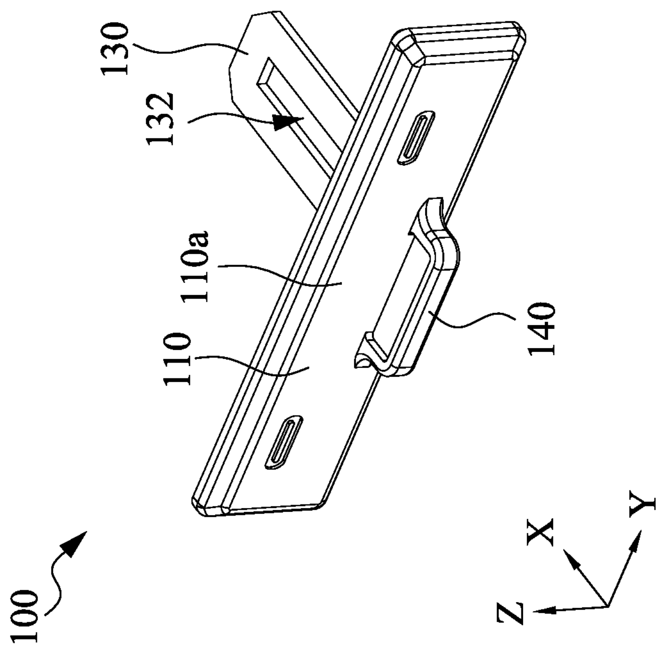
FIG. 2 shows a schematic view of a water-proof cover according to an embodiment of the present disclosure.
Figure 3:
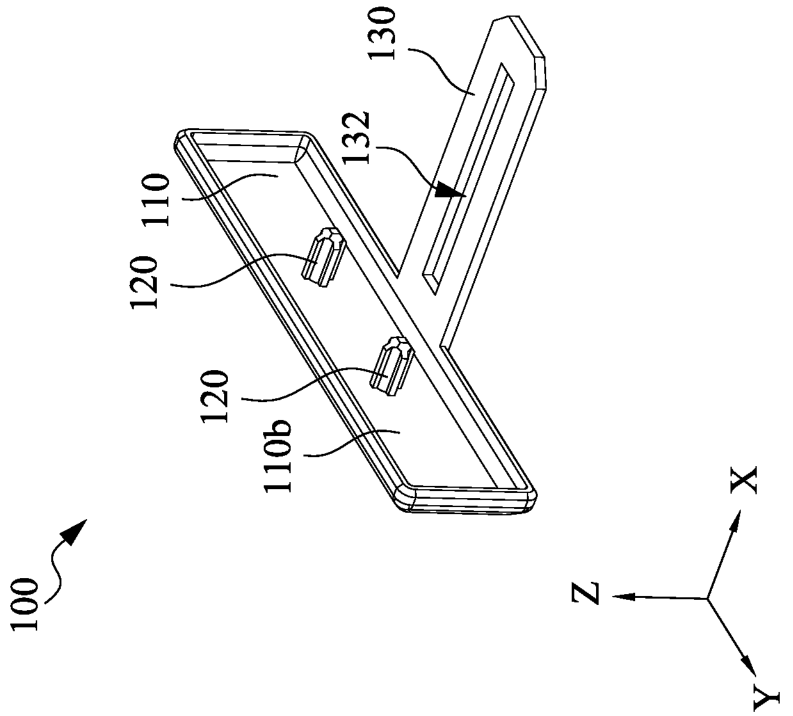
FIG. 3 shows another schematic view of a water-proof cover according to an embodiment of the present disclosure.

Reference is made to FIG. 2 and FIG. 3. FIG. 2 and FIG. 3 are schematic views of the water-proof cover 100 in different viewing angles according to an embodiment of the present disclosure. In this embodiment, as shown in FIG. 2 and FIG. 3, the water-proof cover 100 includes a cover body 110, positioning columns 120, a guiding plate 130, and a handle 140. The cover body 110 has a front side surface 110*a* and a back side surface 110*b*. The positioning columns 120 are disposed on the back side surface 110*b* of the cover body 110. The guiding plate 130 is disposed on an edge of the cover body 110. The guiding plate 130 has a guiding groove 132. The handle 140 is disposed on the front side surface 110*a* of the cover body 110.

In some embodiments, the number of the positioning columns 120 is two, but the present disclosure is not limited thereto. The present disclosure does not intend to limit the number of positioning columns 120.

In some embodiments, as shown in FIG. 2 and FIG. 3, the guiding groove 132 is substantially centered relative to the guiding plate 130. For example, the guiding groove 132 is substantially centered relative to the guiding plate 130 in a direction (for example, Y-direction), but the present disclosure is not limited thereto.

In some embodiments, the guiding groove 132 and the guiding plate 130 extend along the same direction (for example, X-direction), but the present disclosure is not limited thereto.

In some embodiments, the guiding grooves 132 are substantially enclosed grooves. As shown in FIG. 2 and FIG. 3, the guiding groove 132 extends along a direction (for example, the X-direction), but the present disclosure is not limited thereto.

Figure 4:
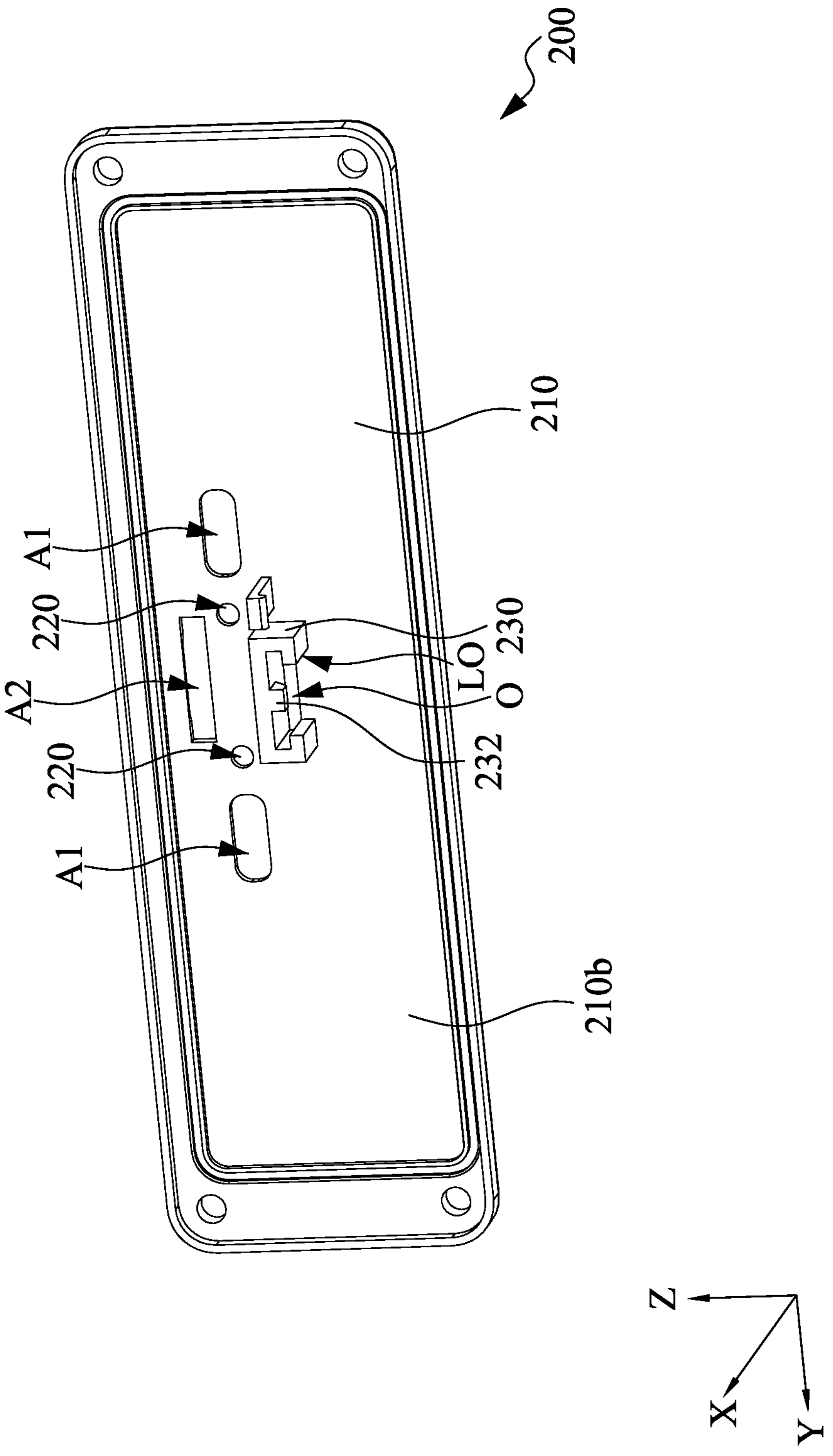
FIG. 4 shows a schematic view of a panel according to an embodiment of the present disclosure.

Reference is made to FIG. 4. FIG. 4 is a schematic view of a panel 200 according to an embodiment of the present disclosure. In this embodiment, as shown in FIG. 4, the panel 200 further includes a plate body 210, positioning holes 220, a sliding channel 230, and an opening O. The plate body 210 has a back side surface 210*b*. The positioning holes 220 are disposed on the plate body 210 and run through the plate body 210, and are configured to be combined with the positioning columns 120. The sliding channel 230 is disposed on the plate body 210 and configured for slidably inserting the guiding plate 130. More specifically, as shown in FIG. 1 and FIG. 4, the sliding channel 230 is connected to the groove G and runs through the panel 200. As shown in FIG. 4, the sliding channel 230 has a guiding block 232. In more detail, as shown in FIG. 4, the guiding block 232 is disposed on an inner wall of the sliding channel 230, and the guiding block 232 is configured to be slidably engaged with the guiding groove 132. As shown in FIG. 4, the opening O is disposed on the plate body 210 and is connected to the sliding channel 230.

In some embodiments, the number of the positioning holes 220 is two, but the present disclosure is not limited thereto. The present disclosure does not intend to limit the number of positioning holes 220.

In some embodiments, as shown in FIG. 4, the sliding channel 230 runs through the panel 200 and protrudes outward from the back side surface 210*b* of the panel 200, but the present disclosure is not limited thereto.

In some embodiments, as shown in FIG. 4, the sliding channel 230 protrudes in a direction (for example, X-direction), and the sliding channel 230 extends in a direction (for example, X-direction), but the present disclosure is not limited thereto.

In some embodiments, as shown in FIG. 4, the sliding channel 230 also has a lower opening LO disposed relative to the guiding block 232. The lower opening LO is configured to provide a space for the guiding plate 130 to deform in the sliding channel 230 when the guiding plate 130 is inserted in the sliding channel 230.

Reference is made to FIG. 5. FIG. 5 shows the quick-release combination structure CS in more detail.

In some embodiments, as shown in FIG. 5, the body 210 of the panel 200 has a front side surface 210*a*, and the groove G is recessed from the front side surface 210*a*. In some embodiments, as shown in FIG. 5, the positioning column 120 has a surface 120*a* and includes extending portions 122. The extending portions 122 are distributed around the surface 120*a*. Since the extending portions 122 are located on the surface 120*a*, the positioning columns 120 can be tightly fitted with the positioning holes 220 when the positioning columns 120 are inserted in the positioning holes 220.

In some embodiments, as shown in FIG. 5, the guiding plate 130 includes an end portion 130A. The end portion 130A encloses an end of the guiding groove 132 away from the cover body 110. Moreover, when the guiding plate 130 slides in the sliding channel 230 in a direction away from the panel 200, the guiding block 232 contacts and stops the end portion 130A to prevent the water-proof cover 100 from detaching from the panel 200, which will be described in detail below.

Figure 6:
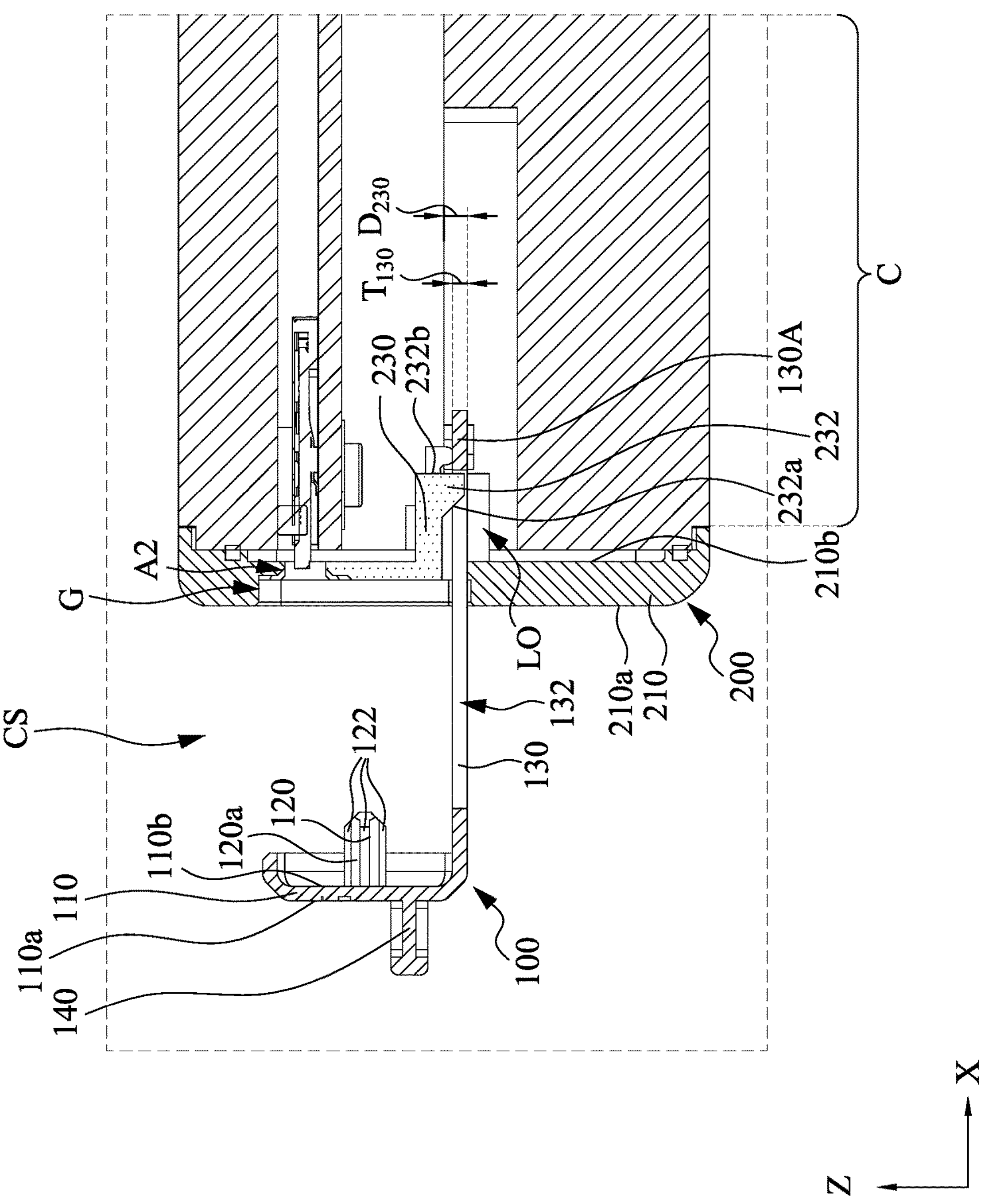
FIG. 6 shows a cross-sectional view of a quick-release combination structure according to an embodiment of the present disclosure.

Reference is made to FIG. 6. FIG. 6 shows the quick-release combination structure CS in more detail.

In some embodiments, as shown in FIG. 6, the guiding block 232 has an inclined surface 232*a*. The inclined surface 232*a* faces the cover body 110. In more detail, the inclined surface 232*a* extends from the inner wall of the sliding channel 230, and the inclined surface 232*a* gradually approaches the guiding groove 132 in the direction away from the cover body 110.

In some embodiments, as shown in FIG. 6, the guiding block 232 has a stop surface 232*b*. The stop surface 232*b* is located at an end of the sliding channel 230 away from the cover body 110. More specifically, the stop surface 232*b* is configured to contact a side of the end portion 130A that encloses the guiding groove 132.

With the aforementioned structural configuration, when the water-proof cover 100 moves toward the panel 200 to be combined with the panel 200, the water-proof cover 100 is inserted in the sliding channel 230 by the guiding plate 130, and the end portion 130A contacts the guiding block 232 and follows the inclined surface 232*a*, and further allows the guiding plate 130 to deform temporarily. The aforementioned lower opening LO provides a space allowing the guiding plate 130 to deform. When the end portion 130A slides through the guiding block 232 so that the guiding block 232 enters the guiding groove 132, the guiding plate 130 restores its shape so that the guiding block 232 can slide in the enclosed guiding groove 132, whereby the water-proof cover 100 combined with panel 200. When the water-proof cover 100 moves away from the panel 200, the end portion 130A is stopped by the stop surface 232*b* to prevent the water-proof cover 100 from being separated from the panel 200.

Next, how the water-proof cover 100 is installed on the panel 200 to combine the water-proof cover 100 with the panel 200 will be described in detail.

Reference is made again to FIG. 5 and FIG. 6. FIG. 5 and FIG. 6 respectively are cross-sectional views of the quick-release combination structure CS in different viewing angles according to an embodiment of the present disclosure. In a usage scenario, when the user wants to install the waterproof cover 100 on the panel 200, the user first uses, for example, the handle 140, and uses the end portion 130A to align the end of the sliding channel 230 close to the panel 200 (for example, the opening O, as shown in FIG. 4). Next, the user pushes the water-proof cover 100 toward the panel 200 by using the handle 140, so that the guiding plate 130 is inserted in the sliding channel 230 through the opening O.

Next, when the guiding plate 130 enters the sliding channel 230, the end portion 130A contacts the guiding block 232 firstly. When the user continues to push the water-proof cover 100 toward the panel 200 using the handle 140, the end portion 130A will continue to move along the inclined surface 232*a* of the guiding block 232. Since the guiding block 232 is located on the moving path of the guiding plate 130, the sliding channel 230 has a lower opening LO, and the guiding plate 130 is a flexible material, so that the guiding plate 130 may cause temporary deformation when the end portion 130A is interfered by the guiding block 232 during the moving process. For example, the aforementioned temporary deformation deforms the end portion 130A into a U-shape in a plane (for example, plane Y-Z). In other words, the aforementioned temporary deformation causes the end portion 130A to be at least partially accommodated in the lower opening LO.

Next, when the user continues to push the water-proof cover 100 toward the panel 200 using the handle 140, the end portion 130A continues to move to allow the guiding block 232 enters the guiding groove 132, and at the same time, the guiding plate 130 restores its shape from the temporary deformation. As shown in FIG. 5 and FIG. 6, when the guiding block 232 is inserted in the guiding groove 132, the guiding groove 132 is limited by the guiding block 232, thereby the water-proof cover 100 combined with the panel 200.

Next, how the water-proof cover 100 reciprocates relative to the panel 200 after the water-proof cover 100 is combined with the panel 200 will be described in detail.

In this embodiment, when the user uses the handle 140 to combine the water-proof cover 100 with the panel 200, the guiding block 232 is slidably engaged with the guiding groove 132. Accordingly, the water-proof cover 100 can reciprocate in a direction (for example, X-direction) relative to the panel 200.

In more detail, in a usage scenario, when the user uses the handle 140 to move the water-proof cover 100 away from the panel 200, an inner wall of the guiding groove 132 away from the cover body 110 will contact the stop surface 232*b*, as shown in FIG. 5 and FIG. 6. In other words, the end portion 130A contacts the stop surface 232*b*, and the guiding block 232 stops the end portion 130A by the stop surface 232*b*, so that the water-proof cover 100 does not continue to move away from the panel 200 and separates from the panel 200.

Next, when the guiding block 232 stops the end portion 130A and the user leaves the handle 140, an end of the water-proof cover 100 close to the cover body 110 will hang down naturally due to gravity.

As shown in FIG. 6, the guiding plate 130 has a thickness $T_{130}$, and the sliding channel 230 has an inner wall distance $D_{230}$. In some embodiments, the thickness $T_{130}$ of the guiding plate 130 is smaller than the inner wall distance $D_{230}$ between inner walls of the sliding channel 230. Since the thickness $T_{130}$ of the guiding plate 130 is smaller than the inner wall distance $D_{230}$ of the sliding channel 230, two ends of the guiding plate 130 can seesaw in the direction of the thickness $T_{130}$ of the guiding plate 130 relative to the panel 200.

In some embodiments, a ratio of the thickness $T_{130}$ of the guiding plate 130 to the inner wall distance $D_{230}$ of the sliding channel 230 may be, for example, about 1:2, thereby allowing the two ends of the guiding plate 130 to seesaw in the direction of the thickness $T_{130}$ of the guiding plate 130 relative to the panel 200. This is merely an example for simple description, and the present disclosure does not intend to limit the ratio of the thickness $T_{130}$ of the guiding plate 130 to the inner wall distance $D_{230}$ of the sliding channel 230.

In some embodiments, since the guiding plate 130 is disposed on the edge of the cover body 110 (for example, the guiding plate 130 is connected to an edge of a lower part of the cover body 110), so that a space required for the user to respectively insert the wire and the memory card in the first opening A1 and the second opening A2 can be provided when the end of the water-proof cover 100 close to the cover body 110 hangs down naturally due to gravity, thereby reducing the interference between the inserted wire and the memory card and the cover body 110.

Figure 7:
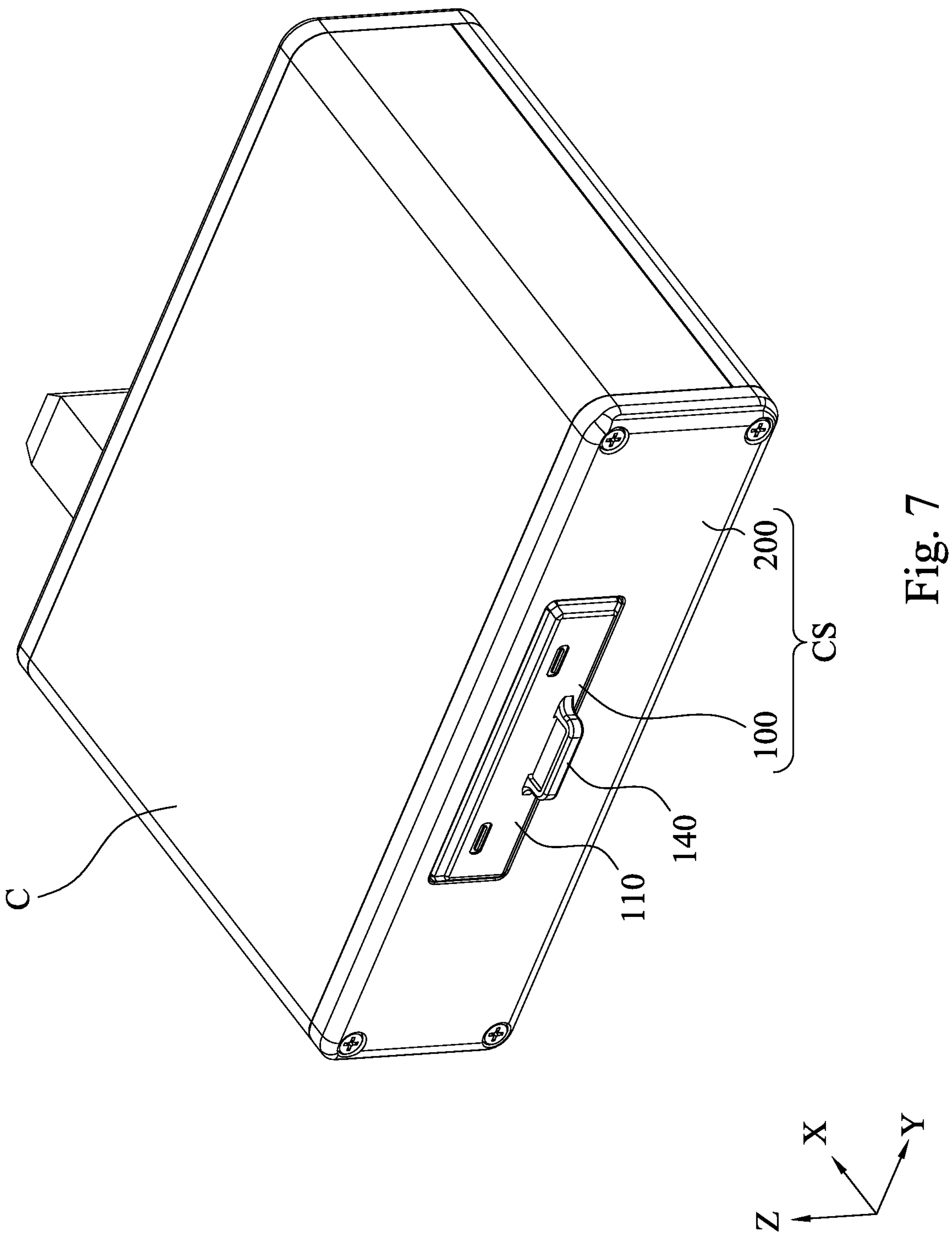
FIG. 7 shows another schematic view of the quick-release combination structure and the central control element according to an embodiment of the present disclosure.
Figure 8:
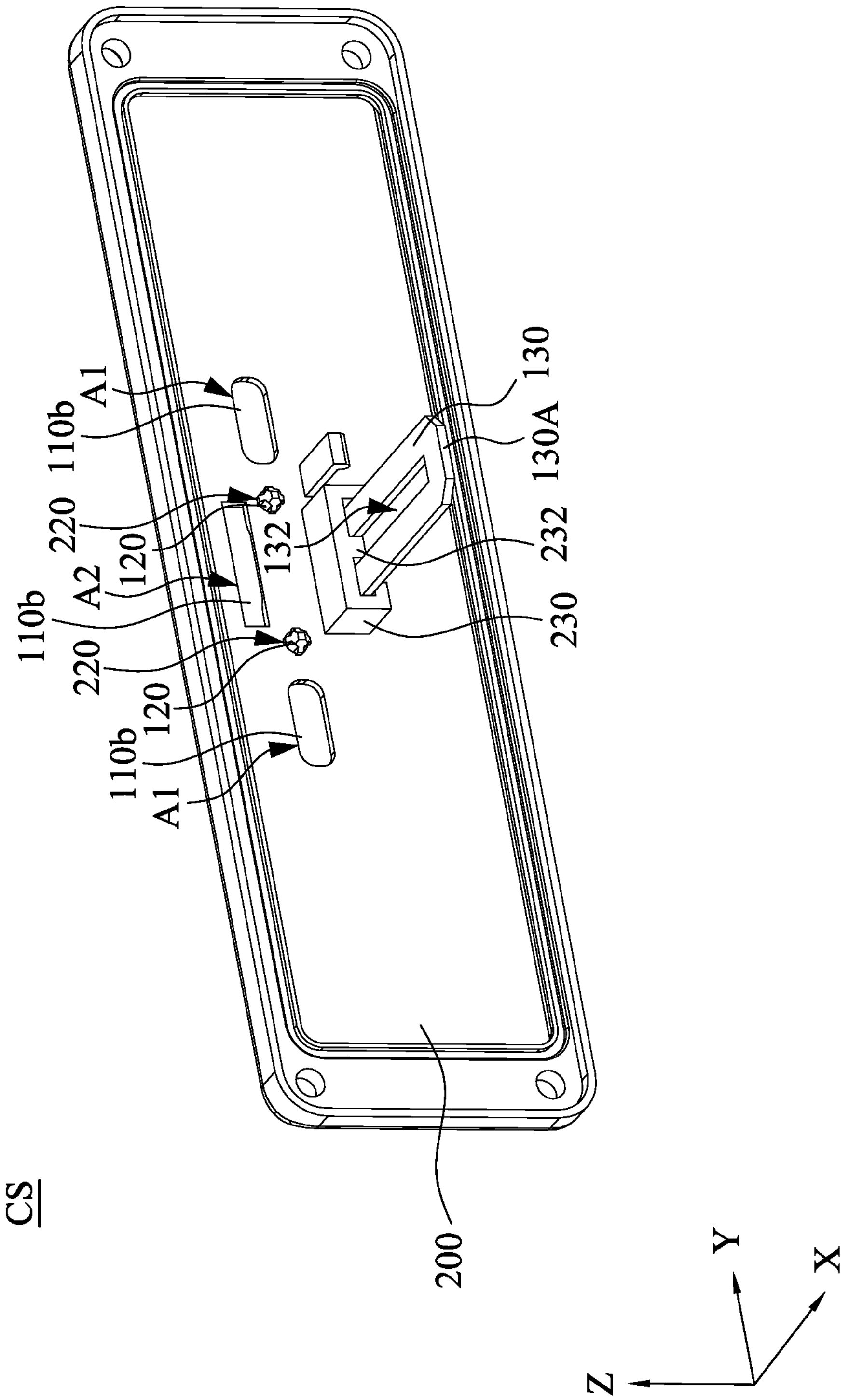
FIG. 8 shows a schematic view of the combination of the water-proof cover and the panel according to an embodiment of the present disclosure.

Reference is made to FIG. 7 and FIG. 8. FIG. 7 and FIG. 8 are schematic views of the water-proof cover 100 approaching the panel 200 so that the cover body 110 is accommodated in the groove G as shown in FIG. 1, FIG. 5, and FIG. 6 in different viewing angles. In a usage scenario, when the user uses the handle 140 to push the water-proof cover 100 toward the panel 200, the cover body 110 is at least partially accommodated in the groove G and covers the sliding channel 230. When the cover body 110 is at least partially accommodated in the groove G, the cover body 110 can cover the sliding channel 230, the first opening A1 and the second opening A2 (as shown in FIG. 8), and the positioning columns 120 can be combined with the positioning holes 220 by extending portions 122 protruding outward the surface 120*a*. In this embodiment, the cover body 110 is air-tightly accommodated in the groove G of the panel 200 relative to the outside, so it can prevent the splashing of liquid from the outside, so as to achieve the effect of protecting the electronic components located in the central control device C. In this case, as shown in FIG. 8, the guiding block 232 is still engaged with the guiding groove 132, thereby the water-proof cover 100 reciprocating relative to the panel 200.

Figure 9:
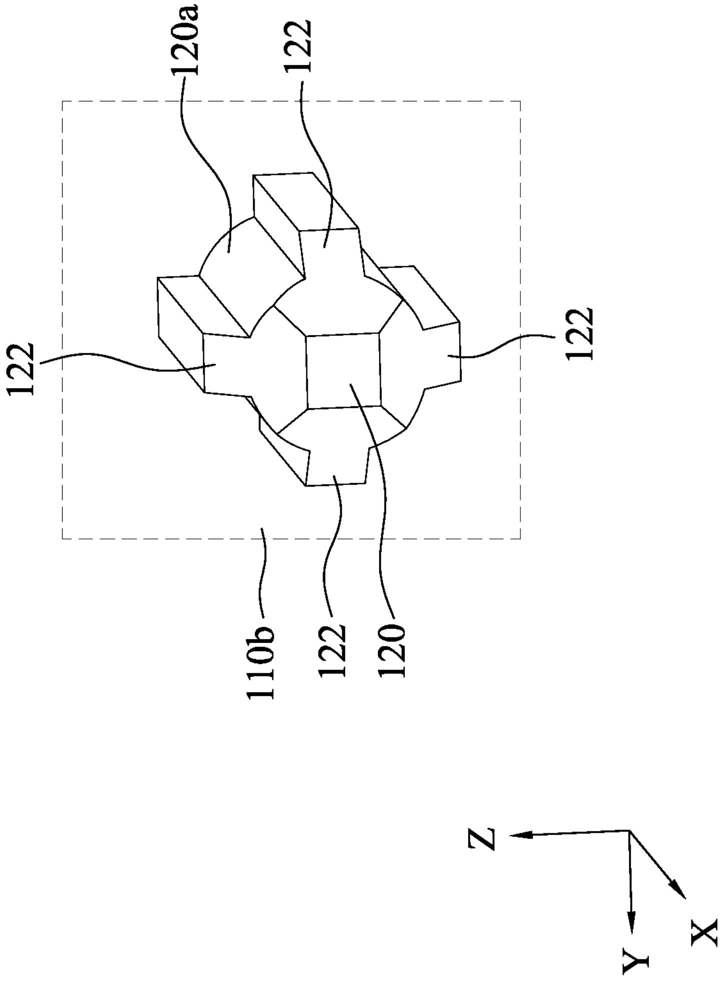
FIG. 9 shows a schematic view of a positioning column according to an embodiment of the present disclosure.

Reference is made to FIG. 9. FIG. 9 is an enlarged schematic view of one of the positioning columns 120 according to an embodiment of the present disclosure. The positioning column 120 has several extending portions 122 on the surface 120*a*. In some embodiments, the extending portions 122 extend from and protrude away from the surface 120*a* and elongated in a direction (for example, X-direction) with the positioning column 120. In some embodiments, as shown in FIG. 9, the number of the extending portions 122 may be four, but the present disclosure does not intend to limit the number of the extending portions 122. Therefore, when the cover body 110 contacts the groove G and is at least partially accommodated in the groove G, each of the positioning column 120 can be tightly fitted with each of the positioning hole 220 and the cover body 110 is not easily released from the panel 200.

From the above detailed description of the specific embodiments of the present disclosure, it can be clearly seen that in the quick-release combination structure of the present disclosure, since the sliding channel includes the guiding block and is disposed on the inner wall of the sliding channel and the guiding plate includes the guiding groove, so that the guiding block and the guiding groove are slidably engaged, thereby the water-proof cover combined with the panel. In the quick-release combination structure of the present disclosure, since the water-proof cover includes positioning columns disposed on the surface of the cover body, and the panel includes positioning holes, the positioning columns and the positioning holes can be combined and tightly fitted with each other, which not only makes it difficult for the cover body to separate and loose from the panel, but can effectively prevent the electronic components in the central control device from being damaged due to the spilling and splashing of liquid from the outside. In the quick release combination structure of the present disclosure, since the guiding plate includes the end portion and the guiding block includes the stop surface, so that the end portion can be stopped by the stop surface of the guiding block, thereby preventing the user from pulling the water-proof cover separating from the panel when the user pulls the waterproof cover away from the panel. In the quick-release combination structure of the present disclosure, since the guiding plate includes the end, the guiding block has the inclined surface, and the sliding channel includes the lower opening, the user can easily install the water-proof cover on the panel. With the quick-release combination structure of the present disclosure, the user can quickly install the water-proof cover on the panel, and effectively protect the electronic components in the central control device from being damaged.

In an embodiment of the present disclosure, the technology of the present disclosure can be applied to in-vehicle devices, such as self-driving cars, electric cars, or semi-self-driving cars, and the like.

In an embodiment of the present disclosure, the quick-release combination structure of the present disclosure can be applied to a server, which can be used for artificial intelligence (AI) computing, edge computing, or used as a 5G server, cloud server or vehicle networking server.

Although the present disclosure has been disclosed as above in the embodiment manner, it does not intended to limit the present disclosure. Those skilled in the art can make various changes and modifications without departing from the spirit and scope of the present disclosure. Therefore, the scope of the present disclosure shall be subject to the scope of the attached claims.

What is claimed is:

1. A quick-release combination structure, comprising:
- a panel comprising:
  - a groove recessed from a surface of the panel; and
  - a sliding channel connected to the groove and running through the panel; and
- a water-proof cover comprising:
  - a cover body configured to be at least partially accommodated in the groove and cover the sliding channel; and
  - a guiding plate connected to the cover body and slidably inserted in the sliding channel, wherein a thickness of the guiding plate is smaller than a distance of an inner wall of the sliding channel in a thickness direction of the guiding plate, thereby allowing two ends of the guiding plate to seesaw in the thickness direction relative to the panel.

2. The quick-release combination structure of claim 1, wherein the sliding channel comprises a guiding block disposed on an inner wall of the sliding channel, the guiding plate comprises a guiding groove, and the guiding block is configured to be slidably engaged with the guiding groove.

3. The quick-release combination structure of claim 2, wherein the guiding block comprises an inclined surface facing the cover body.

4. The quick-release combination structure of claim 2, wherein the guiding plate comprises an end portion, and the end portion encloses an end of the guiding groove away from the cover body.

5. The quick-release combination structure of claim 2, wherein the sliding channel comprises a lower opening disposed relative to the guiding block.

6. The quick-release combination structure of claim 1, wherein the guiding plate is connected to an edge of the cover body.

7. The quick-release combination structure of claim 1, wherein the water-proof cover further comprises a positioning column disposed on a surface of the cover body, the panel has a positioning hole, and the positioning column is configured to be combined with the positioning hole.

8. The quick-release combination structure of claim 7, wherein the positioning column includes an extending portion, and the extending portion protrudes outward from a surface of the positioning column and is connected to the surface of the cover body.

9. The quick-release combination structure of claim 7, wherein the extending portion and the positioning column extend in a direction.

10. The quick-release combination structure of claim 1, wherein the water-proof cover further comprises a handle disposed on a side of the cover body away from the panel.

11. A quick-release combination structure, comprising:
- a panel comprising a sliding channel running through the panel, wherein the sliding channel comprises a guiding block disposed on an inner wall of the sliding channel; and
- a water-proof cover comprising:
  - a cover body configured to cover the sliding channel; and
  - a guiding plate connected to the cover body and slidably inserted in the sliding channel, wherein:
    - the guiding plate comprises a guiding groove, and the guiding block is configured to be slidably engaged with the guiding groove, and
    - a thickness of the guiding plate is smaller than a distance of an inner wall of the sliding channel in a thickness direction of the guiding plate, thereby allowing two ends of the guiding plate to seesaw in the thickness direction relative to the panel.

12. The quick-release combination structure of claim 11, wherein the guiding block includes an inclined surface facing the cover body.

13. The quick-release combination structure of claim 11, wherein the guiding plate includes an end portion, and the end portion encloses an end of the guiding groove away from the cover body.

14. The quick-release combination structure of claim 11, wherein the sliding channel includes a lower opening disposed relative to the guiding block.

15. The quick-release combination structure of claim 11, wherein the guiding plate is connected to an edge of the cover body.

16. The quick-release combination structure of claim 11, wherein the water-proof cover further comprises a positioning column disposed on a surface of the cover body, the panel has a positioning hole, and the positioning column is configured to be combined with the positioning hole.

17. The quick-release combination structure of claim 16, wherein the positioning column includes an extending portion, and the extending portion protrudes outward from a surface of the positioning column and is connected to the surface of the cover body.

18. The quick-release combination structure of claim 17, wherein the extending portion and the positioning column extend in a direction.

19. The quick-release combination structure of claim 11, wherein the water-proof cover further comprises a handle disposed on a side of the cover body away from the panel.

* * * * *